J. T. BRADY.
GAS SERVICE COCK.
APPLICATION FILED JAN. 18, 1909.
932,437.
Patented Aug. 31, 1909.
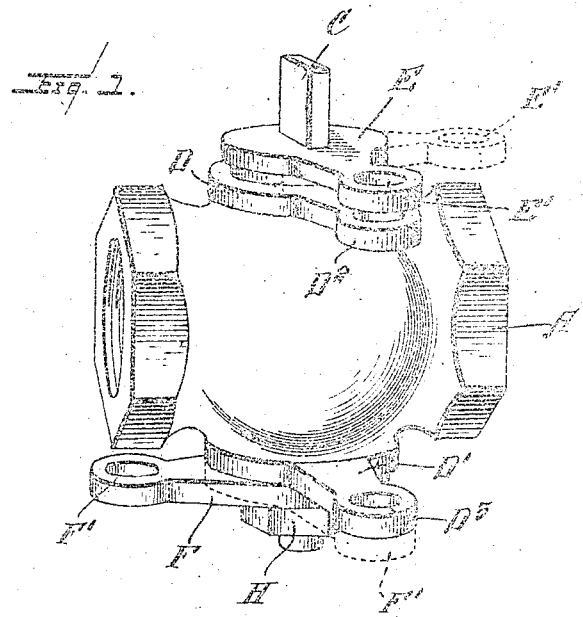
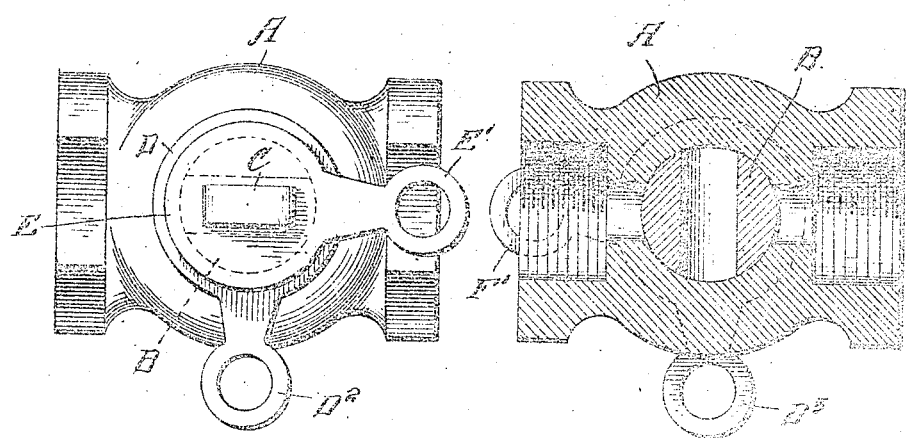

UNITED STATES PATENT OFFICE.

JOHN T. BRADY, OF ST. LOUIS, MISSOURI.

GAS SERVICE-COCK.

932,437.

Specification of Letters Patent.   Patented Aug. 31, 1909.

Application filed January 13, 1909. Serial No. 472,118.

*To all whom it may concern:*

Be it known that I, JOHN THOMAS BRADY, a citizen of the United States, residing at St. Louis, State of Missouri, have invented certain new and useful Improvements in Gas Service-Cocks; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in attachments to valves for service pipes, affording means whereby the valve may be held locked either open or closed and comprises various details of construction, combinations and arrangements of parts which will be hereinafter fully described and then specifically defined in the appended claim.

I illustrate my invention in the accompanying drawings, in which:—

Figure 1 is a perspective view of a valve casing showing my improvements applied to the valve therein. Fig. 2 is a top plan view showing the valve plug open, and Fig. 3 is a sectional view horizontally through the valve casing, showing the valve closed.

Reference now being had to the details of the drawings by letter, A designates a valve casing which may be of any shape or size and is provided with a plug valve B having a stem C. Said casing has two laterally projecting wings D and D' which are parallel to each other, the former of which is provided with an aperture $D^2$ and the latter with a similar aperture $D^3$. Integral with said stem is a laterally projecting wing E which is parallel to the wing D and is provided with an aperture E' designed, when the valve is closed, to register with the aperture $D^2$, forming means whereby the tongue of a padlock or other device may be inserted therethrough for the purpose of holding the valve closed. Upon said stem is mounted at the lower end of the casing a washer F having a laterally projecting arm with an aperture F' therein which arm is positioned at right angles to the wing E which is integral with said stem and mounted adjacent to the upper edge of the casing. A nut H is mounted upon the lower threaded end of the valve stem and is adapted to bear against said washer F. As the stem C is given a quarter revolution for the purpose of opening the valve, the aperture F' will come in registration with the aperture $D^3$ in the wing D' and afford means for passing the tongue of a padlock or other article through said registering apertures to lock the valve open.

From the foregoing, it will be noted that, by the provision of the means shown and described, a simple and efficient attachment is afforded whereby a service valve may be locked in an open or a closed relation, the washer F and the integral wing E being at all times at right angles to each other, the one indicating that the valve is open while the other indicates that the valve is closed.

What I claim to be new and desire to secure by Letters Patent is:—

In combination with the casing of a service valve having laterally projecting parallel arms provided with registering apertures, a plug valve having a stem, laterally projecting apertured arms upon said stem, one upon either side of the casing and positioned at right angles to each other and adapted to be thrown alternately so that the apertures therein will register with one or the other of the apertures in the projections of the arms upon said casing when the valve is thrown to its limit in one direction or the other.

In testimony whereof I hereunto affix my signature in the presence of two witnesses.

JOHN T. BRADY.

Witnesses:
A. L. HOUGH,
FRANKLIN H. HOUGH.